United States Patent
Sekiguchi

(10) Patent No.: US 8,342,215 B2
(45) Date of Patent: Jan. 1, 2013

(54) TIRE SEALANT LIQUID CONTAINER

(75) Inventor: Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 385 days.

(21) Appl. No.: 12/535,470

(22) Filed: Aug. 4, 2009

(65) Prior Publication Data

US 2010/0071801 A1    Mar. 25, 2010

(30) Foreign Application Priority Data

Sep. 22, 2008    (JP) .................................. 2008-243083

(51) Int. Cl.
*B65B 1/04*    (2006.01)
(52) U.S. Cl. .......... 141/329; 141/38; 141/114; 141/313; 81/15.5
(58) Field of Classification Search .................... 141/38, 141/67, 100, 105, 114, 231, 313, 329, 330; 81/15.6
See application file for complete search history.

(56) References Cited

U.S. PATENT DOCUMENTS

| | | | | |
|---|---|---|---|---|
| 5,908,145 | A | * | 6/1999 | Jaksa ............................. 222/394 |
| 6,019,145 | A | | 2/2000 | Savidge |
| 6,345,650 | B1 | * | 2/2002 | Paasch et al. ..................... 141/5 |
| 6,766,834 | B1 | * | 7/2004 | Eckhardt ......................... 141/38 |
| 6,889,723 | B2 | | 5/2005 | Gerresheim et al. |
| 6,964,284 | B2 | | 11/2005 | Eckhardt |
| 7,178,564 | B2 | | 2/2007 | Kojima et al. |
| 7,389,800 | B2 | * | 6/2008 | Hickman et al. ................ 141/26 |
| 7,789,110 | B2 | | 9/2010 | Marini |
| 7,798,183 | B2 | | 9/2010 | Cegelski et al. |
| 7,854,242 | B2 | | 12/2010 | Stehle |
| 8,016,002 | B2 | | 9/2011 | Yoshida et al. |
| 2010/0071822 | A1 | | 3/2010 | Sekiguchi |

FOREIGN PATENT DOCUMENTS

| | | |
|---|---|---|
| JP | A 9-118779 | 5/1997 |
| JP | A 2000-108215 | 4/2000 |
| JP | A 2008-23909 | 2/2008 |

* cited by examiner

*Primary Examiner* — Gregory Huson
*Assistant Examiner* — Jason K Niesz
(74) *Attorney, Agent, or Firm* — Greer, Burns & Crain, Ltd.

(57) ABSTRACT

Provided is a tire sealant liquid container that accommodates a tire sealant liquid, and that includes: an air inlet guiding therein a compressed air outputted by a compressor; and a tire sealant liquid outlet guiding the tire sealant liquid into a tire. The air inlet is provided at a position above a liquid level of the tire sealant liquid, and the tire sealant liquid outlet is provided at a position below the air inlet.

5 Claims, 5 Drawing Sheets

TIRE SEALANT LIQUID CONTAINER

BACKGROUND OF THE INVENTION

1. Field of the Invention

The present invention relates to a tire sealant liquid container, and more specifically to a tire sealant liquid container having a simple structure and preventing a tire sealant liquid from remaining in a container body or from flowing back.

2. Description of the Related Art

Recently, what is called a puncture repair kit has been widely used. When a pneumatic tire (hereinafter, simply referred to as "tire") is punctured, the puncture repair kit is used to inject a tire sealant liquid into the punctured tire so that the tire sealant liquid can flow in a hole caused by the puncture. Then, with the puncture repair kit, the inner pressure of the punctured tire is increased up to a predetermined regulation value. Use of such a puncture repair kit eliminates the need of loading a vehicle with a spare tire, and thus has an advantage in resource saving and vehicle weight reduction as well as an advantage of allowing a space provided for loading a spare tire to be effectively used for another purpose.

FIGS. 7 and 8 each show a conventional puncture repair kit. As shown in FIGS. 7 and 8, each of these puncture repair kits includes: a pressure-resistant container (container body 2) accommodating a tire sealant liquid 7; an air inlet 3; and a tire sealant liquid outlet 4. An air supply hose 5 and a tire sealant liquid injection hose 6 are connected to the air inlet 3 and the tire sealant liquid outlet 4, respectively. Compressed air outputted by a compressor C passes through the air supply hose 5, and then enters the container body 2 through the air inlet 3. As a result, the compressed air pushes out the tire sealant liquid 7 accommodated in the container body 2 through the tire sealant liquid outlet 4. Then, the tire sealant liquid 7 passes through the tire sealant liquid injection hose 6, and is then introduced in a tire T.

Generally, puncture repair kits as described above are categorized into two types based on shapes during use: an upright type and an inverted type. As shown in FIG. 7, in a puncture repair kit of the upright type, the air inlet 3 and the tire sealant liquid outlet 4 are formed on the upper side of the container body 2, which is described in Japanese patent application Kokai publication No. Hei 9-118779, for example. Meanwhile, as shown in FIG. 8, in a puncture repair kit of the inverted type, the air inlet 3 and the tire sealant liquid outlet 4 are formed on the lower side of the container body 2, which is described in Japanese patent application Kokai publication No. 2000-108215, for example.

However, the inverted type has a risk that connecting an air supply hose to the lower side of a container body might allow a tire sealant liquid to flow back through the hose upon shutdown of a compressor. This might further lead to a problem that, after flowing back, the tire sealant liquid enters the compressor, which causes breakdown of the compressor to disable the operation thereof.

On the other hand, the upright type has a problem of being incapable of injecting all the tire sealant liquid accommodated in a container body, and thus has a problem of allowing the tire sealant liquid to remain in a bottom portion of the container body. In particular, when the container body is inclined during use, the upright type cannot inject a required amount of the tire sealant liquid, which leads to insufficient puncture repair.

SUMMARY OF THE INVENTION

The present invention has been made to address the above problems, and an object thereof is to provide a tire sealant liquid container having a simple structure and preventing a tire sealant liquid from remaining in a container body or from flowing back.

To achieve the above object, a tire sealant liquid container according to the present invention includes: a container body having an end provided with an opening for filling a tire sealant liquid; an air inlet to which an air supply hose for guiding a compressed air outputted by a compressor is connected; and a tire sealant liquid outlet to which a tire sealant liquid injection hose for guiding the tire sealant liquid into a tire is connected. In the tire sealant liquid container, the air inlet is provided to the container body at a position that comes above a liquid level of the tire sealant liquid when the container body is made to stand upright for puncture repair. Meanwhile, the tire sealant liquid outlet is provided at a lower position opposite to the position of the air inlet.

In addition, the tire sealant liquid container having the above structure should preferably be constructed as described as the following (1) to (5).

(1) The opening is provided at a position to be located on a lower side of the container body when the container body stands upright, and the tire sealant liquid outlet is connected to any one of the opening and a cap to be fitted to the opening.

(2) A sealing film is attached onto the opening, and a protrusion to pierce the sealing film is provided on an inner surface of the cap at an eccentric position.

(3) The cap is provided with a stand on the outer surface.

(4) The opening is provided at a position to be located on an upper side of the container body when the container body stands upright, and the air inlet is provided to any one of the opening and a cap to be fitted to the opening. Meanwhile, the tire sealant liquid outlet is provided on a bottom surface of the container body.

(5) The container body is provided with a stand on a bottom of the container body.

According to the present invention, a tire sealant liquid container includes: a container body having an end provided with an opening for filling a tire sealant liquid; an air inlet to which an air supply hose for guiding a compressed air outputted by a compressor is connected; and a tire sealant liquid outlet to which a tire sealant liquid injection hose for guiding the tire sealant liquid into a tire is connected. In the tire sealant liquid container, the air inlet is provided to the container body at a position that comes above a liquid level of the tire sealant liquid when the container body is made to stand upright for puncture repair. Meanwhile, the tire sealant liquid outlet is provided at a lower position opposite to the position of the air inlet. Though simple in structure as described above, the tire sealant liquid container according to the present invention can prevent the tire sealant liquid from remaining in the container body or from flowing back toward the compressor.

DETAILED DESCRIPTION OF THE PREFERRED EMBODIMENTS

Figure 1:
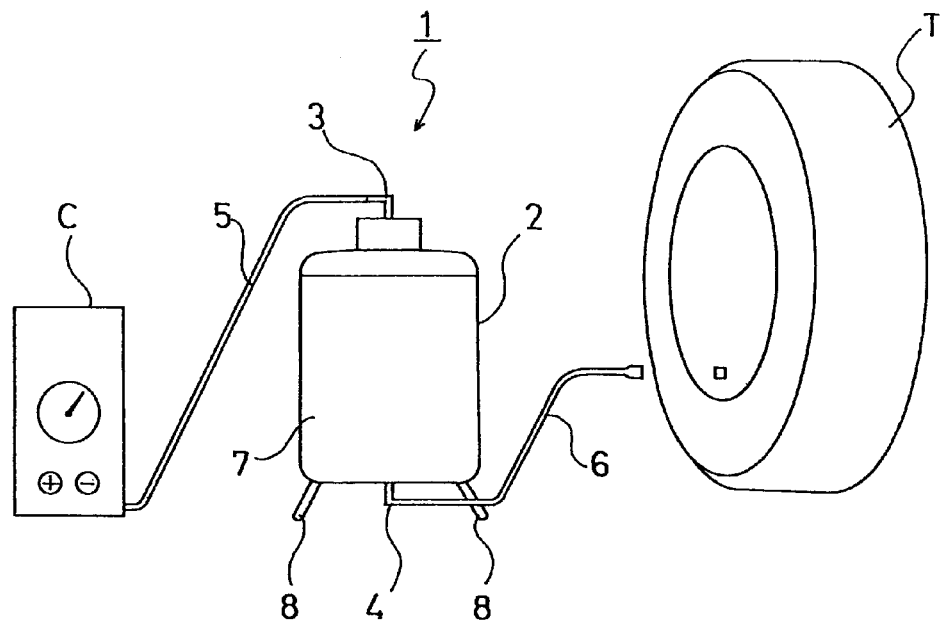
FIG. 1 is a schematic view showing a usage state of a tire sealant liquid container according each embodiment of the present invention.

FIG. 1 is a schematic view showing a usage state of a tire sealant liquid container 1 according to the present invention. The tire sealant liquid container 1 has a container body 2 that accommodates a tire sealant liquid 7 therein. The container body 2 is provided with an air inlet 3 on the upper side, and with a tire sealant liquid outlet 4 on the lower side. An air supply hose 5 and a tire sealant liquid injection hose 6 are connected to the air inlet 3 and the tire sealant liquid outlet 4, respectively. Compressed air outputted by a compressor C passes through the air supply hose 5, and then enters the container body 2 through the air inlet 3. As a result, the compressed air pushes out the tire sealant liquid 7 accommodated in the container body 2 through the tire sealant liquid outlet 4. Then, the tire sealant liquid 7 passes through the tire sealant liquid injection hose 6, and is then introduced in a tire T.

Figure 2:
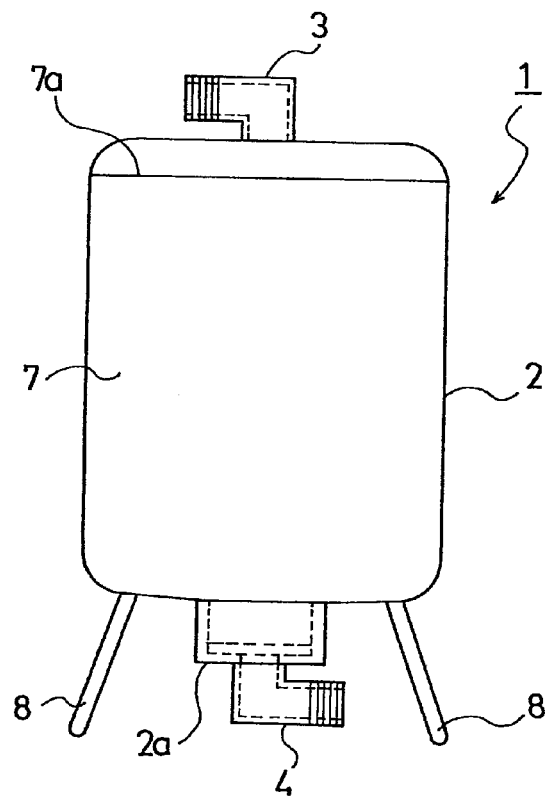
FIG. 2 is a cross-sectional view of a tire sealant liquid container according to an embodiment of the present invention.

FIG. 2 is a cross-sectional view of the tire sealant liquid container 1 according to an embodiment of the present invention. In FIG. 2, the tire sealant liquid 7 is accommodated in the container body 2. The air inlet 3 is provided to the container body 2 at a position that comes above a liquid level 7*a* of the tire sealant liquid 7 when the container body 2 is made to stand upright for puncture repair. Meanwhile, the tire sealant liquid outlet 4 is provided at a lower position opposite to the position of the air inlet 3. Accordingly, though simple in structure, the tire sealant liquid container 1 can prevent the tire sealant liquid 7 from being forced to flow back by its own weight. In addition, the tire sealant liquid container 1 can prevent the tire sealant liquid 7 from remaining in the container body 2 after use.

Figure 3:
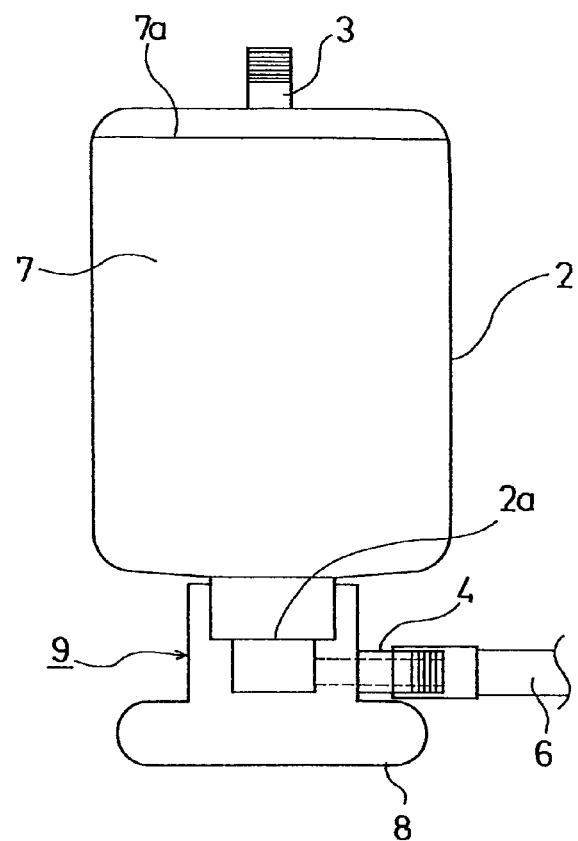
FIG. 3 is a cross-sectional view of a tire sealant liquid container according to another embodiment of the present invention.

Moreover, it is preferable to provide an opening 2*a* at a position to be located on the lower side of the container body 2 when the container body 2 stands upright, and to provide the tire sealant liquid outlet 4 to the opening 2*a*, as shown in FIG. 2. Alternatively, it is also preferable to provide the tire sealant liquid outlet 4 to a cap 9 to be fitted to the opening 2*a*, as shown in FIG. 3. It is especially preferable to provide the tire sealant liquid outlet 4 on the bottom of the container body 2, as shown in FIGS. 2 and 3. This allows efficient discharge of the tire sealant liquid 7, and thus prevents the tire sealant liquid 7 from remaining in the container body 2.

Figure 6:
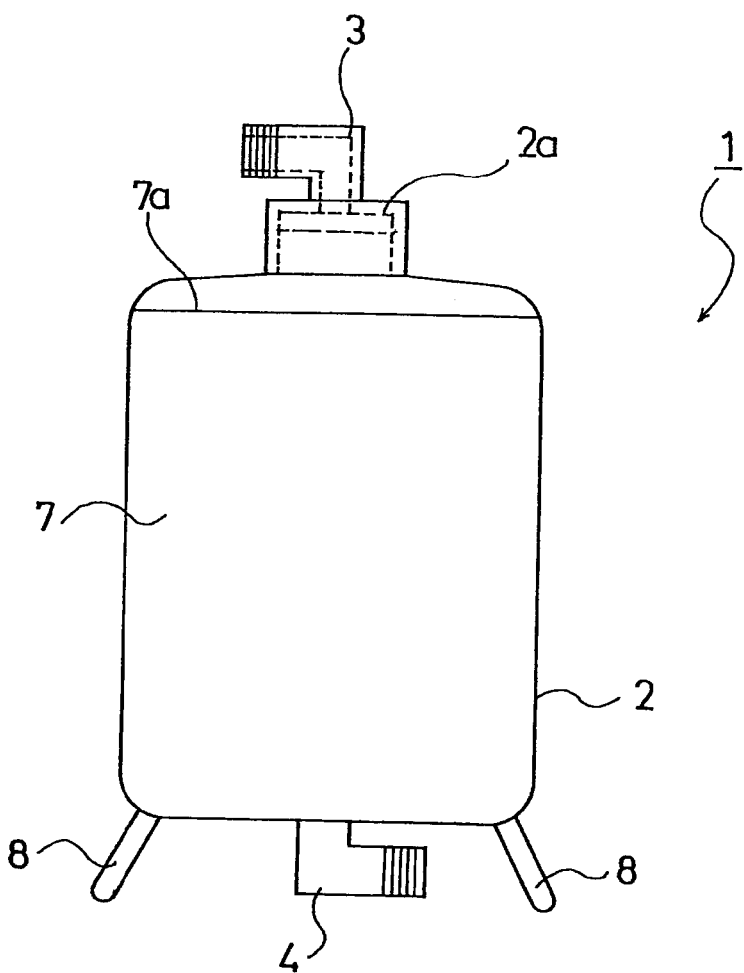
FIG. 6 is a cross-sectional view of a tire sealant liquid container according to still another embodiment of the present invention.
Figure 7:
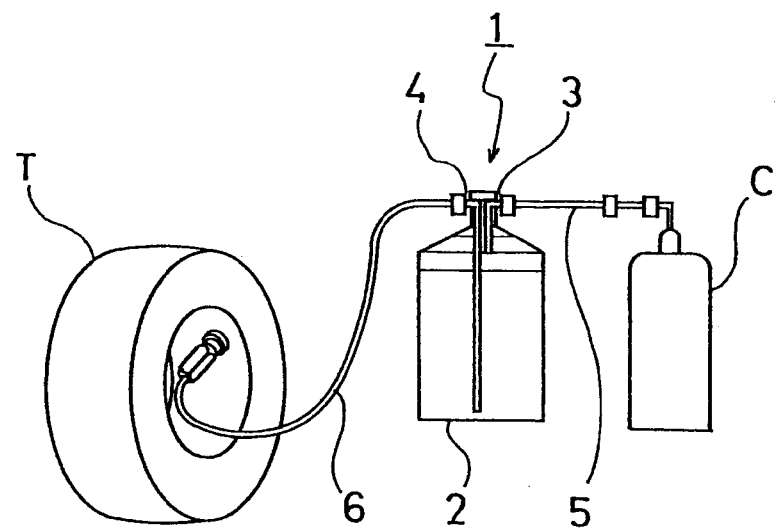
FIG. 7 is a schematic view showing a usage state of a conventional tire sealant liquid container.
Figure 8:
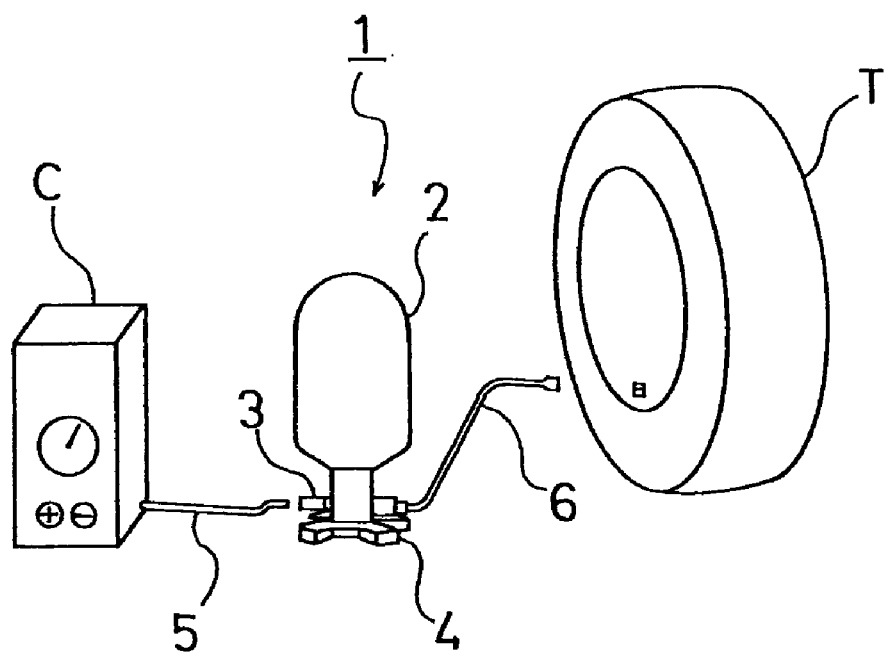
FIG. 8 is a schematic view showing a usage state of another conventional tire sealant liquid container.

In addition, when the tire sealant liquid outlet 4 is formed on the bottom of the container body 2, the container body 2 may be provided with a stand 8 so as to maintain stable position during use. The stand 8 may have any shape, and, for example, may be formed to have several legs as shown in FIG. 6.

Meanwhile, it is preferable to provide the air inlet 3 at a position to be located on the upper side, especially on the top surface, of the container body 2 when the container body 2 stands upright. When the tire sealant liquid 7 is filled up to the top of the container body 2 before use, providing the air inlet 3 at a position such as on the side surface of the container body 2 might cause liquid leakage. Thus, it is preferable to provide the air inlet 3 on the top surface of the container body 2.

The hole of the air inlet 3 may be different from that of the tire sealant liquid outlet 4 in diameter, or in shape for allowing hose insertion. This difference of the holes helps preventing mistakes in connecting the hoses to use the tire sealant liquid container 1. For example, the air inlet 3 may be designed to be stopped up by a cap or the like before use, and opened to allow the hose to be connected thereto for use. Meanwhile, the tire sealant liquid outlet 4 may use a member, such as a T/L valve, for allowing the flow channel in the hose to communicate with the tire sealant liquid outlet 4 when the hose is connected thereto.

Note that the shape of the container body 2 is not limited to a vertically long shape as shown in FIG. 2, but may be any shape such as a horizontally long shape as long as the container body 2 is pressure-resistant enough to withstand the pressure of the compressed air introduced from the compressor C.

Figure 4:
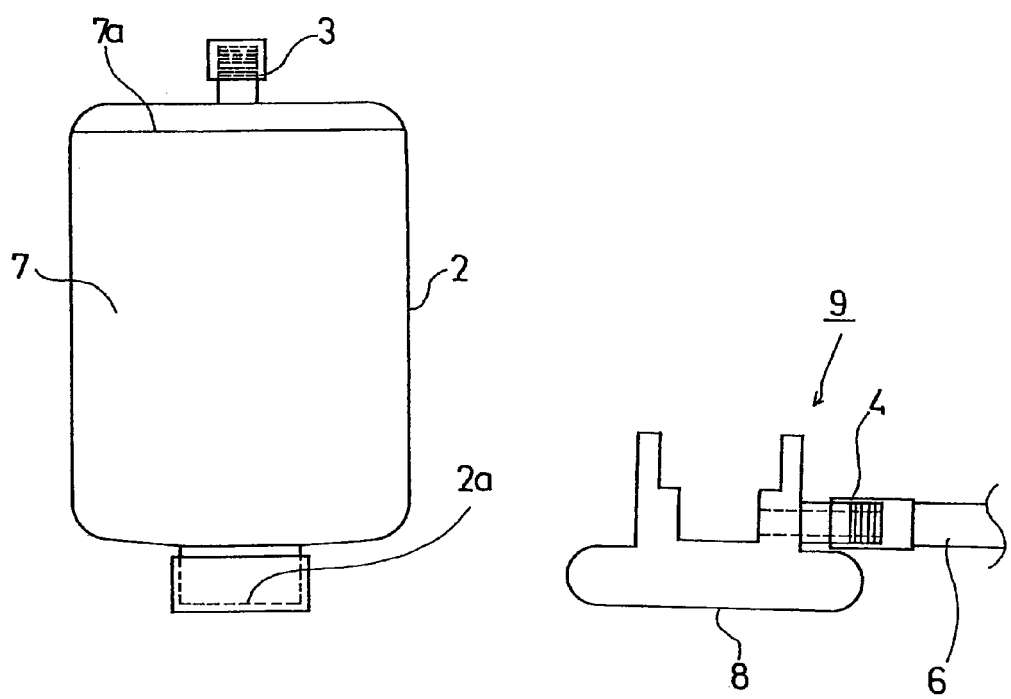
FIG. 4 shows cross-sectional views respectively of a container body and a stand included in the embodiment shown in FIG. 3.

As shown in FIGS. 3 and 4, the container body 2 and the cap 9 may be designed to be combined during use. Forming the container body 2 and the cap 9 as separate members is effective in space saving since this structure allows the container body 2 and the cap 9 to be separately loaded in a vehicle when not used. In addition, this structure is also effective in resource saving since, after use, just the container body 2 needs to be exchanged but the cap 9 can be reused.

In this structure, as shown in FIG. 4, the air inlet 3 and the opening 2*a* of the container body 2 are stopped up to prevent leakage or degradation of the tire sealant liquid 7. It is especially preferable to more reliably seal up the opening 2*a* by using a sealing film made of aluminum or a resin.

Figure 5A:
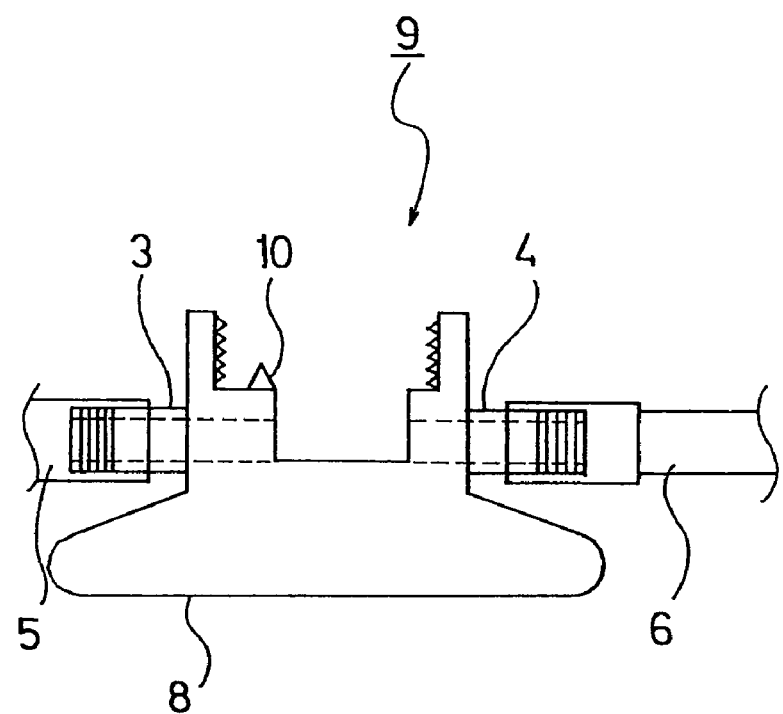
FIGS. 5*a* and 5*b* are each a cross-sectional view of a cap portion according to another embodiment of the present invention.
Figure 5B:
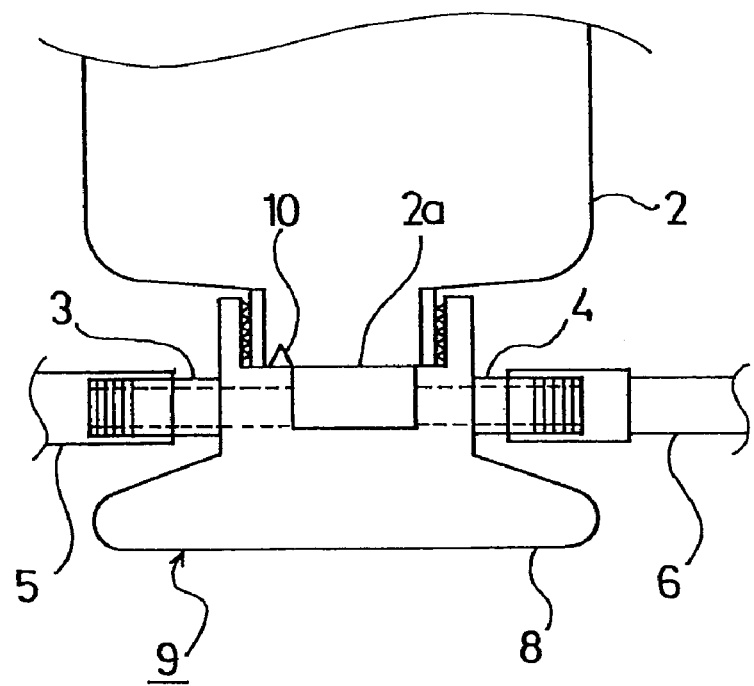

In the case of providing the sealing film, a protrusion 10 to pierce the sealing film should preferably be provided on the inner surface of the cap 9 at an eccentric position, as shown in FIGS. 5*a* and 5*b*. In particular, when the cap 9 is combined with the container body 2 by screwing thereon, providing the protrusion 10 at an eccentric position of the cap 9 increases the length of the break of the sealing film caused by the protrusion 10, and thus reliably enables the tire sealant liquid 7 to flow out. By contrast, when the protrusion 10 is provided at the center of the cap 9, the protrusion 10 can pierce the sealing film, but cannot make a major break in the sealing film even after the screwing rotation of the cap 9. The protrusion 10 should preferably have such a length as to break the sealing film by a quarter of the circumference of the opening 2*a*. Making too major break in the sealing film might cause a fragment of the broken sealing film to jam in the hose. Note that the cap 9 should preferably be provided with a stand 8 on the outer surface so as to maintain stable position of the tire sealant liquid container 1 during use.

FIG. 6 is a cross-sectional view of the tire sealant liquid container 1 according to another embodiment of the present invention. In this embodiment, the opening 2*a* is provided at a position to be located on the upper side of the container body 2 when the container body 2 stands upright, and the air inlet 3 is provided to the opening 2*a*. Alternatively, as in the foregoing embodiment, the air inlet 3 may be provided to the cap 9 to be fitted to the opening 2*a*. In this case, the tire sealant liquid outlet 4 should preferably be provided on the bottom of the container body 2.

In addition, when the tire sealant liquid outlet 4 is formed on the bottom, the container body 2 may be provided with the stand 8 so as to maintain stable position of the tire sealant liquid container 1 during use. The stand 8 may have any shape, and, for example, maybe formed to have several legs as shown in FIG. 6.

What is claimed is:

1. A tire sealant liquid container comprising:
a container body having an end provided with an opening for filling a tire sealant liquid, the opening provided at a position located on a lower side of the container body when the container body is in an upright position;
a sealing film attached to the opening;
a cap to be fitted to the opening, the cap including a protrusion provided at an eccentric location on an inner surface of the cap to pierce the sealing film, the cap configured to be threadedly engaged with the container body;
an air inlet to which an air supply hose for guiding a compressed air outputted by a compressor is connected; and
a tire sealant liquid outlet to which a tire sealant liquid injection hose for guiding the tire sealant liquid into a tire is connected, the tire sealant liquid outlet being connected to any one of the opening and the cap,
wherein the air inlet is provided to the container body at a position that comes above a liquid level of the tire sealant liquid when the container body is made to stand upright for puncture repair, and the tire sealant liquid outlet is provided at a lower position opposite to the position of the air inlet.

2. The tire sealant liquid container according to claim 1, wherein the cap is provided with a stand on an outer surface of the cap.

3. The tire sealant liquid container according to claim 1, wherein
the opening is provided at a position to be located on an upper side of the container body when the container body stands upright,
the air inlet is provided to any one of the opening and a cap to be fitted to the opening, and
the tire sealant liquid outlet is provided on a bottom surface of the container body.

4. The tire sealant liquid container according to claim 1, wherein the container body is provided with a stand on a bottom of the container body.

5. The tire sealant liquid container according to claim 3, wherein the container body is provided with a stand on a bottom of the container body.

* * * * *